(12) United States Patent
Matsuzawa et al.

(10) Patent No.: US 9,277,116 B2
(45) Date of Patent: Mar. 1, 2016

(54) IMAGING DEVICE, DISPLAY DEVICE, CONTROL METHOD, AND METHOD FOR CONTROLLING AREA CHANGE

(71) Applicant: Olympus Corporation, Shibuya-ku, Tokyo (JP)

(72) Inventors: Yoshinori Matsuzawa, Hachioji (JP); Tsuyoshi Yaji, Kawagoe (JP); Osamu Nonaka, Sagamihara (JP)

(73) Assignee: Olympus Corporation, Tokyo (JP)

( * ) Notice: Subject to any disclaimer, the term of this patent is extended or adjusted under 35 U.S.C. 154(b) by 60 days.

(21) Appl. No.: 14/145,954

(22) Filed: Jan. 1, 2014

(65) Prior Publication Data
US 2014/0111679 A1    Apr. 24, 2014

Related U.S. Application Data

(63) Continuation of application No. 13/075,534, filed on Mar. 30, 2011, now Pat. No. 8,643,749.

(30) Foreign Application Priority Data

Apr. 1, 2010   (JP) .................................. 2010-085488

(51) Int. Cl.
*H04N 5/262* (2006.01)
*H04N 5/232* (2006.01)
*H04N 5/222* (2006.01)

(52) U.S. Cl.
CPC ....... *H04N 5/23216* (2013.01); *H04N 5/23293* (2013.01); *H04N 5/23296* (2013.01)

(58) Field of Classification Search
CPC .... G02B 15/14; G02B 13/009; G02B 15/161; G02B 15/20; G02B 15/22; H04N 5/23296; H04N 5/23212; H04N 5/23216; G03B 2205/0046; G03B 13/36; G06F 2203/04806
USPC .................. 348/240.1–240.3, 240.99, 211.9, 348/211.13, 333.01
See application file for complete search history.

(56) References Cited

U.S. PATENT DOCUMENTS

| 6,919,927 B1* | 7/2005 | Hyodo ............... H04N 1/00411 348/333.02 |
| 2008/0246852 A1* | 10/2008 | Mori .................. G06K 9/00228 348/222.1 |
| 2010/0020221 A1* | 1/2010 | Tupman .............. G06F 3/04883 348/333.01 |

* cited by examiner

*Primary Examiner* — Trung Diep
(74) *Attorney, Agent, or Firm* — John C. Pokotylo; Straub & Pokotylo

(57) ABSTRACT

An imaging device includes an imaging unit that receives light coming from a subject and thus generates electronic image data; a display unit that displays an image corresponding to the image data; an angle-of-view setting unit that an angle of view to be changed for the image displayed by the display unit according to a first signal input from the outside; and a control unit that starts control of change to a predetermined angle of view set by the angle-of-view setting unit according to a second signal different from the first signal.

13 Claims, 12 Drawing Sheets

"IMAGING DEVICE, DISPLAY DEVICE, CONTROL METHOD, AND METHOD FOR CONTROLLING AREA CHANGE

This application is a continuation application of U.S. patent application Ser. No. 13/075,534 (referred to as "the '534 application" and incorporated herein by reference), filed on Mar. 30, 2011, titled "IMAGING DEVICE, DISPLAY DEVICE, CONTROL METHOD, AND METHOD FOR CONTROLLING AREA CHANGE" and listing Yoshinori MATSUZAWA, Tsuyoshi YAJI, and Osamu NONAKA as the inventors, the '534 application claiming benefit of Japanese Application No. 2010-085488 filed in Japan on Apr. 1, 2010, the contents of which are incorporated by this reference.

BACKGROUND OF THE INVENTION

1. Field of the Invention

The present invention relates to an imaging device, a display device, a control method, and a method for controlling area change, which receive light coming from a subject and thus generate electronic image data.

2. Description of the Related Art

In recent years, digital single-lens reflex cameras have been increasingly widely used. Because the lens unit of a digital single-lens reflex camera is replaceable when required, a user can capture images suitable for various scenes.

A technology is disclosed in which, while a micro computer in a lens unit controls a zoom operation for varying the angle of view in accordance with the rotation of a lens operation zoom ring, a micro computer in the camera body can control a zoom operation in accordance with the operation of a zoom switch (see, Japanese Laid-open Patent Publication No. 10-010405). In this technology, a zoom operation in accordance with the rotation of the zoom ring is performed as a priority over a zoom operation according to an operation of the zoom switch.

SUMMARY OF THE INVENTION

An imaging device according to an aspect of the present invention includes an imaging unit that receives light coming from a subject and thus generates electronic image data; a display unit that displays an image corresponding to the image data; an angle-of-view setting unit that an angle of view to be changed for the image displayed by the display unit according to a first signal input from the outside; and a control unit that starts control of change to a predetermined angle of view set by the angle-of-view setting unit according to a second signal different from the first signal.

An imaging device according to another aspect of the present invention is capable of changing a combination of a lens unit and a body, and includes an imaging unit that is provided on the body and generates electronic image data from a subject image received through the lens unit; a display unit that is provided on the body and displays an image corresponding to the image data; a touch panel that is provided on the display unit; and a control unit that starts control of change of an angle of view to an area specified on the touch panel according to a second signal different from an input through the touch panel.

A display device according to still another aspect of the present invention includes a display unit that displays an image; an angle-of-view setting unit that sets an angle of view corresponding to an area to be enlarged for an image displayed by the display unit according to a first signal that is input from the outside; and a control unit that starts control of enlargement to the angle of view set by the angle-of-view setting unit according to a second signal different from the first signal.

A control method according to still another aspect of the present invention includes generating electronic image data by receiving light coming from a subject; displaying an image corresponding to the image data; setting an angle of view to be changed for the displayed image according to a first signal that is input from the outside; and starting control of change to the set angle of view according to a second signal different from the first signal.

A method for controlling area change according to still another aspect of the present invention includes starting control of changing an image to be displayed on a screen provided with a touch panel to an image on an area specified by a first signal input by multiple touch performed on the touch panel, according to a second signal different from the first signal.

The above and other features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Modes for carrying out the present invention (hereinafter, "embodiments") will be described with reference to the accompanying drawings.

Figure 1:
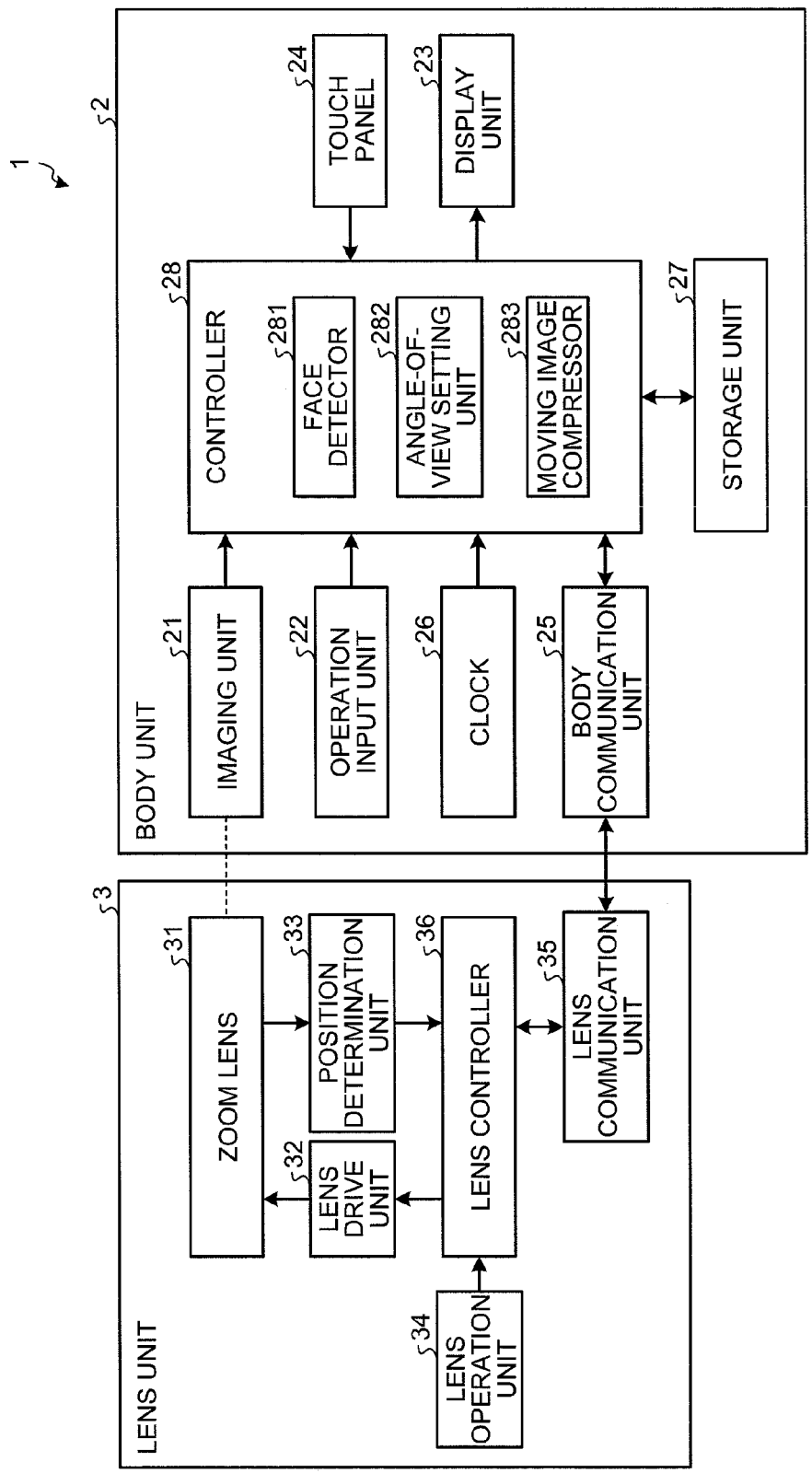
FIG. 1 a diagram of a configuration of an imaging device according to an embodiment of the present invention.
Figure 2:
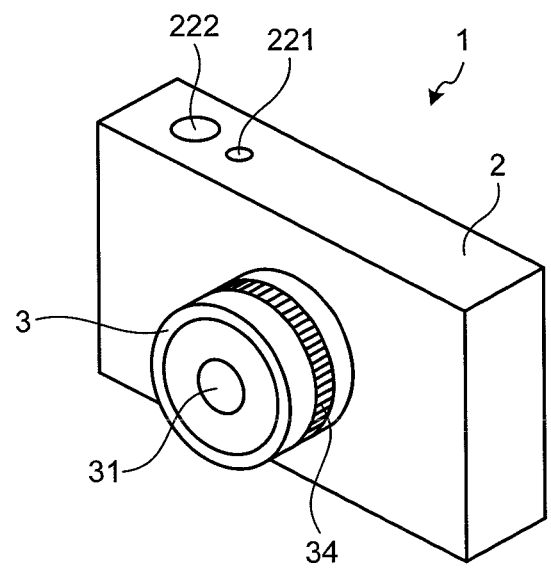
FIG. 2 is a perspective view of a configuration of the front side of the imaging device according to the embodiment of the present invention.
Figure 3:
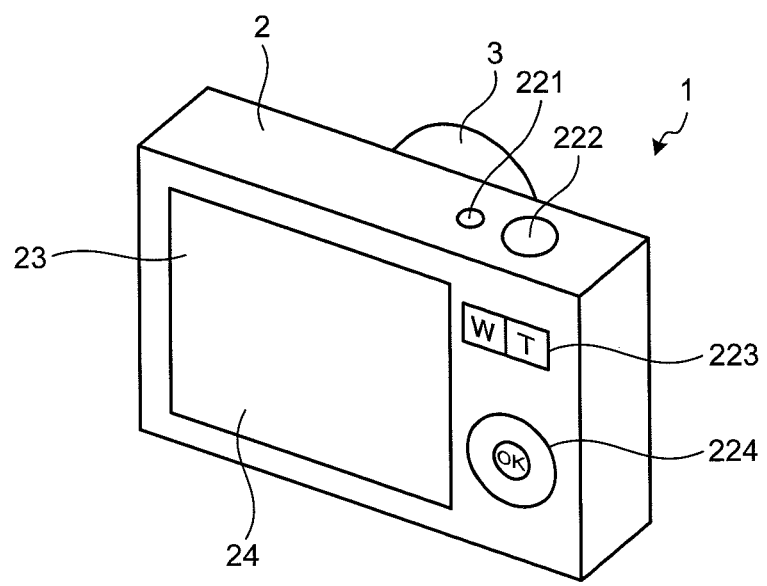
FIG. 3 is a perspective view of a configuration of the back side of the imaging device according to the embodiment of the present invention.

FIG. 1 is a diagram of a configuration of an imaging device according to an embodiment of the present invention. FIG. 2 is a perspective view of a configuration of a side, facing a subject (the front side), of the imaging device according to the embodiment. FIG. 3 is a perspective view of a configuration of a side, facing a user (back side), of the imaging device according to the embodiment. An imaging device 1 in FIG. 1 is a digital single-lens reflex camera that includes a body unit 2 and a lens unit 3 that is detachable from the body unit 2.

The body unit 2 includes an imaging unit 21, an operation input unit 22, a display unit 23, a touch panel 24, a body communication unit 25, a clock 26, a storage unit 27, and a controller 28.

The imaging unit 21 acquires electronic image data by receiving light coming from a subject. Specifically, the imaging unit 21 includes an imaging element, such as a charged coupled device (CCD), that receives light focused by the lens unit 3 and then converts the light to electronic signals; and a signal processing circuit that performs signal processing, such as amplifying, on analog signals output from the imaging element and then generates digital image data by performing A/D conversion.

As illustrated in FIG. 3, the operation input unit 22 includes a power switch 221, a release switch 222 for inputting a release signal giving an image capturing instruction to the imaging device 1, a zoom switch 223 for performing zoom operations of the lens unit 3, and a setting switch 224 for performing various settings of the imaging device 1.

The display unit 23 is realized using a display panel consisting of, for example, liquid crystals or organic electro luminescence (EL) material. The display unit 23 properly displays, in addition to image data, operation information of the imaging device 1 and information on image capturing.

The touch panel 24 is provided on the display screen of the display unit 23 (see FIG. 3). The touch panel 24 detects, on the basis of information displayed on the display unit 23, the point touched by the user and accepts an input of an operation signal according to the touched point. In general, as touch panels, there are resistive touch displays, capacitive touch displays, and optical touch displays. In the embodiment, any touch displays can be used.

The body communication unit 25 is a communication interface for communicating with the lens unit 3 attached to the body unit 2.

The storage unit 27 is realized using a semiconductor memory, such as a flash memory or a dynamic random access memory (DRAM), that is securely provided in the imaging device 1. The storage unit 27 stores image data and stores information, such as the zoom speed, in accordance with the type of the lens unit 3 that is attachable to the body unit 2. While the storage unit 27 records information in a computer-readable recording medium, such as a memory card, inserted from the outside, the recording medium may have a function as a recording medium interface that reads information recorded in the recording medium.

The controller 28 performs predetermined signal processing on the digital signals, which are output from the imaging unit 21, and controls operations of the body unit 2. The controller 28 is realized using, for example, a central processing unit (CPU). The controller 28 includes a face detector 281 that detects the face of a subject contained in a captured image; an angle-of-view setting unit 282 that sets an angle of view, to which the angle of view should be changed, in accordance with an input of the touch panel 24; and a moving-image compressor 283 that compresses moving data captured by the imaging unit 21.

The body unit 2 may have an audio I/O function and a communication function so as to be communicable via the Internet.

The lens unit 3 includes a zoom lens 31, a lens drive unit 32, a position determination unit 33, a lens operation unit 34, a lens communication unit 35, and a lens controller 36. The zoom lens 31 consists of a group of lenses and has a function of varying the angle of view. The position determination unit 33 determines the zoom position of the zoom lens 31. As illustrated in FIG. 2, the lens operation unit 34 is a zoom ring provided around the lens barrel of the lens unit 3. The lens operation unit 34 receives a signal (second signal) for starting change control of angle of view as well as a signal (third signal) for operating the zoom lens 31. Although it is not illustrated in FIG. 2, the lens unit 3 includes an aperture for adjusting the amount of incident light focused by the zoom lens 31.

Figure 4:
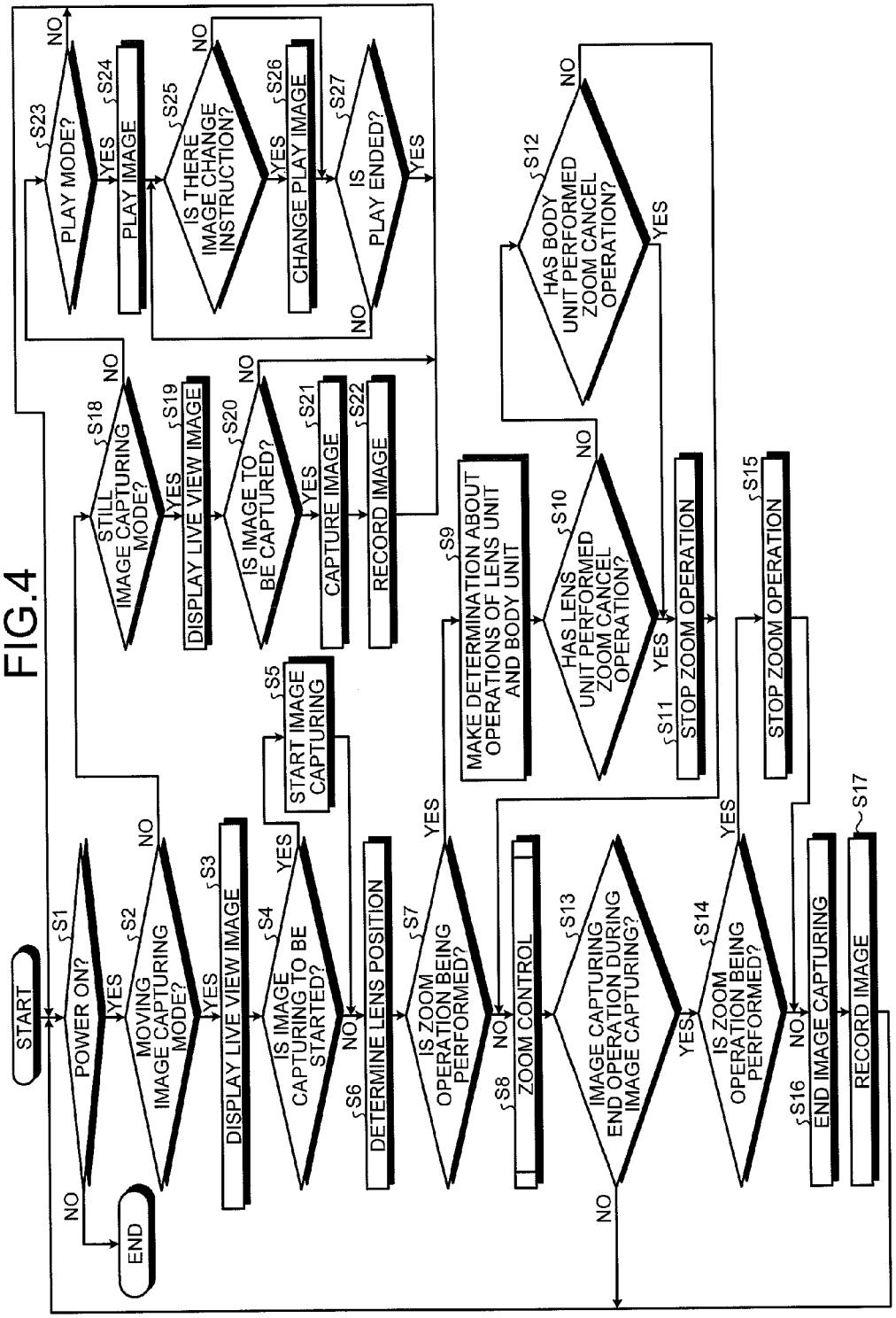
FIG. 4 is a flowchart of an overview of processes of the imaging device according to the embodiment of the present invention.

Processes that are performed by the imaging device 1 having the above-described configuration will be described next. FIG. 4 is a flowchart of an overview of processes performed by the imaging device 1. As represented in FIG. 4, when the power of the imaging device 1 is on (YES at step S1), if the imaging device 1 is set to a moving image capturing mode in which data of multiple images is sequentially generated at certain small intervals (YES at step S2), the controller 28 causes the display unit 23 to display through-the-lens images (step S3). At step S1, when the power of the imaging device 1 is not on (NO at step S1), the imaging device 1 ends the processing.

After step S3, when the release switch 222 is pressed down and thus an instruction signal for starting image capturing is input (YES at step S4), the controller 28 controls the start of image capturing by the imaging unit 21 (step S5). When an instruction signal for starting image capturing is not input (NO at step S4), the imaging device 1 goes to step S6, which will be described below.

At step S6, the position determination unit 33 of the lens unit 3 determines the position of the zoom lens 31 under the control of the lens controller 36 and transmits the result of the determination to the body unit 2 via the lens communication unit 35.

The controller 28 receives the result of the determination on the position of the zoom lens 31, which is transmitted from the lens unit 3 via the body communication unit 25, and determines whether the zoom lens 31 is performing a zoom operation according to the position determination result (step 87). When the result of the determination indicates that the zoom lens 31 is not performing a zoom operation (NO at step S7), the controller 28 performs zoom control (step 88). The zoom control will be described in detail below.

When the determination result at step S7 indicates that the zoom lens 31 is performing a zoom operation (YES at step 87), the controller 28 makes a determination about an operation of the lens unit 3 (step 89). Specifically, the controller 28 determines whether there are signals input by the operation input unit 22 of the body unit 2 and the lens operation unit 34 of the lens unit 3. Whether there is a signal input by the lens operation unit 34 is determined depending on whether there is an operation signal that is transmitted from the lens controller 36 via the lens communication unit 35.

When the result of the operation determination by the controller 28 indicates that the lens operation unit 34 has input an operation signal for canceling a zoom operation (YES at step S10), the controller 28 transmits a signal for stopping a zoom operation of the zoom lens 31 to the lens unit 3 via the body communication unit 25. The lens unit 3 that has received the zoom operation stop signal from the body unit 2 stops the zoom operation by ceasing to drive the lens drive unit 32 under the control of the lens controller 36 (step S11).

When the result of the operation determination by the controller 28 at step S9 indicates that the lens operation unit 34 has not input an operation signal for canceling a zoom operation (NO at step S10) and the operation input unit 22 inputs an operation signal for canceling a zoom operation (YES at step S12), the imaging device 1 goes to step S11.

When the result of the operation determination by the controller 28 at step S9 indicates that neither the lens operation unit 34 nor the operation input unit 22 has input any operation signal for canceling a zoom operation (NO at step S10 and NO at step S12), the imaging device 1 goes to step S13, which will be described below.

After step S8 or step S11, when the imaging device 1 is capturing an image and an image capturing end operation is input (YES at step S13), if the zoom lens 31 is operating a zoom operation (YES at step S14), the controller 28 controls the stopping of the zoom operation (step S15). Thereafter, the controller 28 controls the ending of the image capturing operation by the imaging unit 21 (step S16). At step S14, when the zoom lens 31 is not operating a zoom operation (NO at step S14), the imaging device 1 goes to step S16.

Subsequent to step S16, the controller 28 performs processing, such as compression, on data of a series of images in the moving image compressor 283, and records the data of the series of images in the storage unit 27 (step S17). After step S17, the imaging device 1 goes back to step S1.

At step S13, when the imaging device 1 is capturing an image and an image capturing end operation is not input (NO at step S13), the imaging device 1 goes back to step S1. A case will be described next in which the imaging device 1 is set to a still image capturing mode (NO at step S2 and YES at step S18). In this case, the controller 28 causes the display unit 23 to display through-the-lens images (step S19). Thereafter, when the release switch 222 is pressed down and thus an instruction signal for starting image capturing is input (YES at step S20), the controller 28 controls the image capturing (step S21). The controller 28 then records the generated image data in the storage unit 27 (step S22) and goes back to step 81. At step S20, when an instruction signal for starting image capturing is not input (NO at step S20), the imaging device 1 goes back to step 81.

A case will be described next in which the imaging device 1 is set to a play mode (NO at step S2, NO at step S18, and YES at step S23). In this case, the controller 28 reads a predetermined image from the storage unit 27 and causes the display unit 23 to play and display the image (step S24). The image displayed first here is, for example, the latest image. Thereafter, when the operation input unit 22 inputs a change instruction signal for instructing changing of the image (YES at step S25), the controller 28 reads a specified other image from the storage unit 27 and causes the display unit 23 to display the read other image (step S26). At step S25, when a change instruction signal is not input (NO at step S25), if the operation input unit 22 inputs an instruction signal for ending the play (YES at step S27), the imaging device 1 goes back to step S1. At step S27, when the operation input unit 22 does not input an instruction signal for ending the play (NO at step S27), the imaging device 1 goes back to step S25. If the imaging device 1 is not set to the play mode (NO at step S23), the imaging device 1 goes back to step S21.

Figure 5:
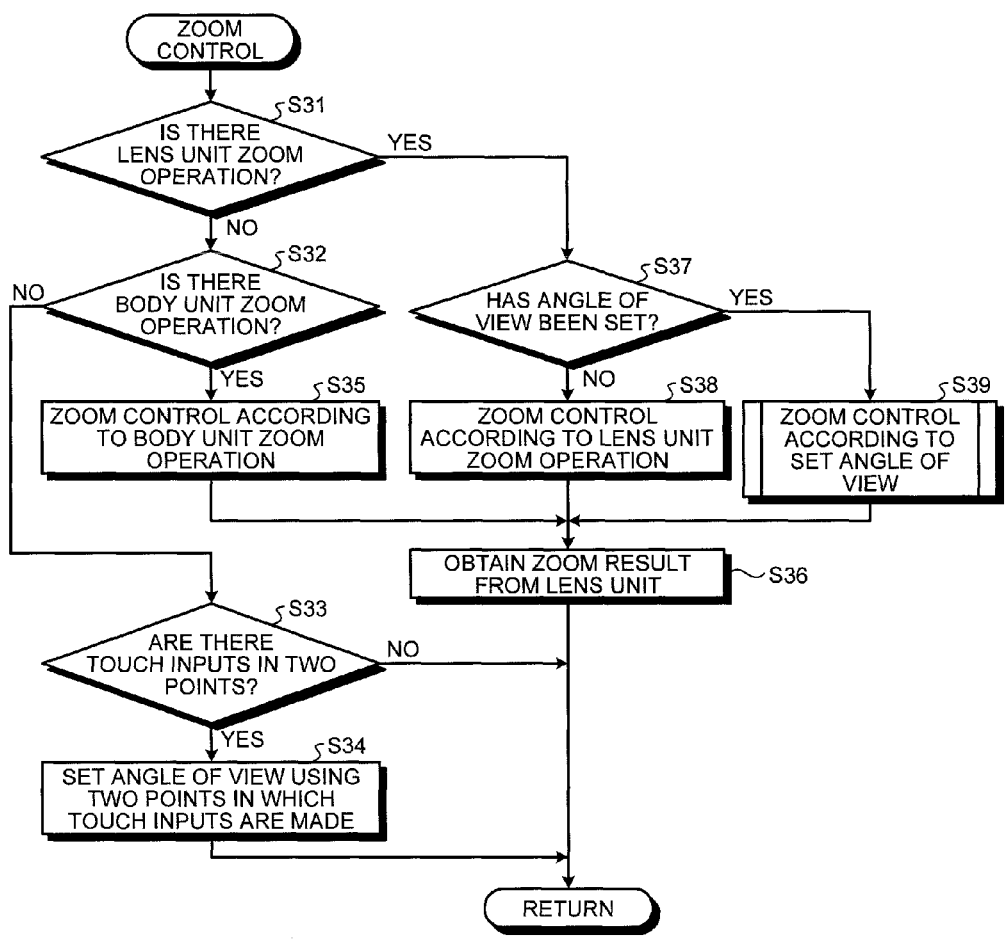
FIG. 5 is a flowchart of an overview of a zoom control process that is performed by the imaging device according to the embodiment of the present invention.

FIG. 5 is a flowchart of an overview of a zoom control process at step S8 in FIG. 4. First, a case will be described in which the lens operation unit 34 does not input a zoom operation signal into the lens unit 3 (NO at step S31) and the operation input unit 22 does not input a zoom operation signal into the body unit 2 (NO at step S32). In this case, when an external object touches the touch panel 24 in two points and thus touch inputs are made (YES at step S33), the angle-of-view setting unit 282 sets an angle of view, to which the angle of view should be changed, by a zoom operation using the two points in which the touch inputs are made (step S34). After step S34, the imaging device 1 goes back to the main routine. At step S33, when an external object does not touch the touch panel 24 in two points and thus no touch input is made (NO at step S33), the imaging device 1 goes back to the main routine.

Figure 6:
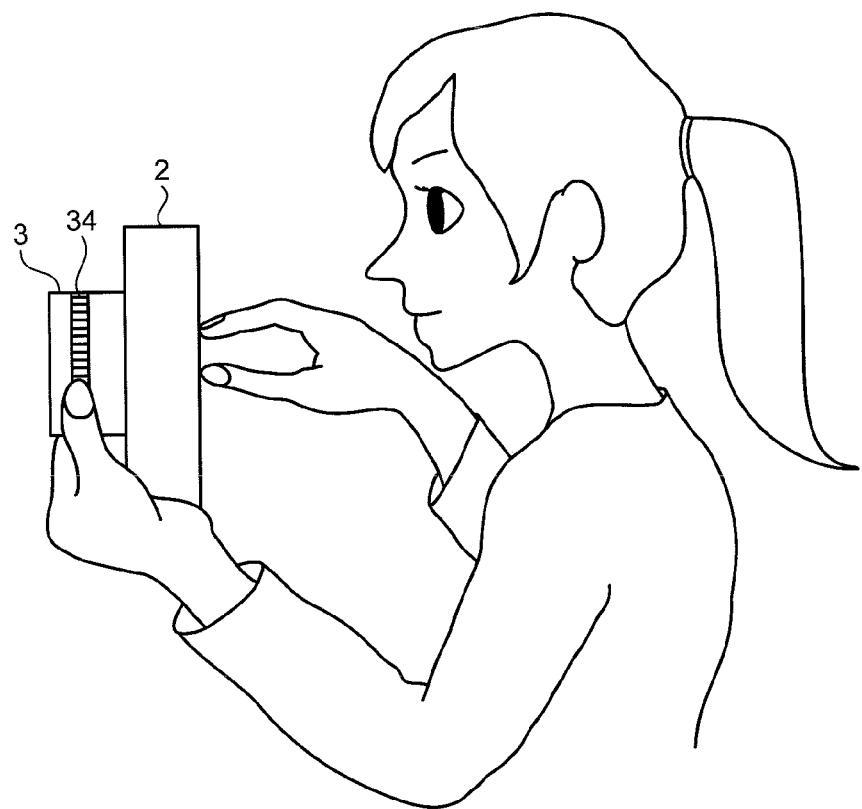
FIG. 6 is a diagram illustrating a user setting an angle of view in the zoom control process.
Figure 7:
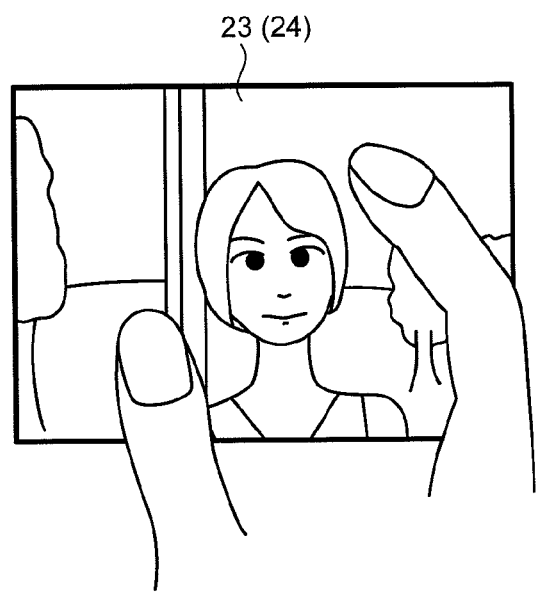
FIG. 7 is a diagram illustrating the points touched by fingers of the right hand of the user in FIG. 6.

FIG. 6 is a diagram illustrating a user setting an angle of view in the zoom control process. FIG. 7 is a diagram illustrating the points touched by the fingers of the right hand of the user in FIG. 6. Without performing a zoom operation, the user specifies the diagonally opposite points of an area to be zoomed in by touching two fingers (the thumb and forefinger in FIG. 6) of the right hand on the touch panel 24.

Figure 8A:
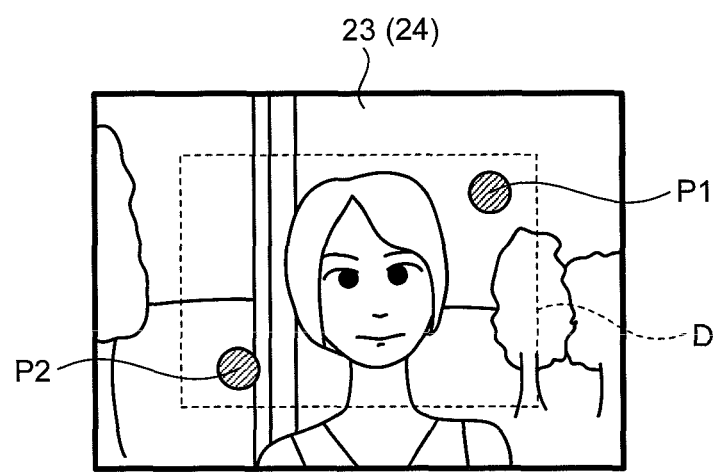
FIG. 8A shows an area of an angle of view that is set by an angle-of-view setting unit in accordance with the touched points in FIG. 7.
Figure 8B:
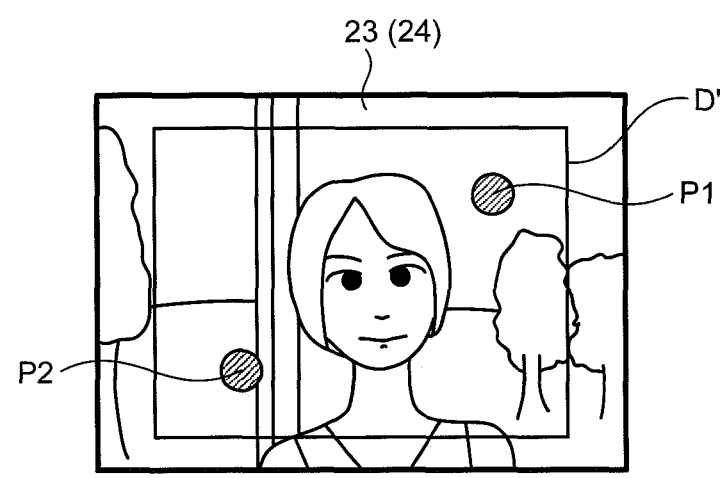
FIG. 8B shows the zoom limit on a display unit.

FIG. 8A is a diagram schematically illustrating an angle of view that is set by the angle-of-view setting unit 282 according to the points touched by the user's two fingers in FIG. 7. As illustrated in FIG. 8, the angle-of-view setting unit 282 sets an angle of view (area D) such that the angle of view contains touched areas PI and P2 touched by the two fingers, such that the touched areas PI and P2 are positioned near the diagonal line, and such that the aspect ratio of the angle of view equals the aspect ratio of the display unit 23. It should be noted that the optical zoom and the electronic zoom each have a zoom limit. Accordingly, in some cases, the angle-of-view setting unit 282 cannot set the angle of view according to the points touched by the user's two fingers. In this case, an area D' indicating the zoom limit may be displayed on the display unit 23 as shown in FIG. 8B. In FIG. 8B, the display unit 23 displays touched areas P1 and P2 as well as the area D'. However, the touched areas P1 and P2 are not necessarily displayed on the display unit 23 when the area D' is displayed.

A case will be described next in which there is no lens unit zoom operation (NO at step S31) and there is a body unit zoom operation (YES at step S32). In this case, the controller 28 controls the zoom in accordance with an operation of the zoom switch 223 and transmits a control signal to the lens unit 3 (step S35). In the lens unit 3, in accordance with the control signal received from the body unit 2, the lens controller 36 drives the lens drive unit 32 so that the drive the zoom lens 31 is driven. Thereafter, the controller 28 obtains the result of the zoom of the zoom lens 31 by receiving a signal representing the zoom result from the lens unit 3 (step 836). The zoom result contains the result of the determination by the position determination unit 33 of the position of the zoom lens 31.

A case will be described next in which there is a lens unit zoom operation (YES at step S31). In this case, when an angle of view for zoom has not been set yet (NO at step S37), in accordance with a zoom signal that is input by the lens operation unit 34, the lens controller 36 drives the lens drive unit 32 to control the zoom of the zoom lens 31 (step S38). Thereafter, the imaging device 1 goes to step S36. The lens unit zoom operation at step S31 is performed in a way that, as illustrated in FIG. 6, the user rotates the lens operation unit 34 with the user's left hand. Thus, in this case, the user can have an operation feeling similar to that of a mechanical zoom operation.

Furthermore, even when the user holds the imaging device 1 to which the lens unit 2 having a large replaceable lens is attached, the user can easily perform an operation quickly and intuitively while supporting something such as the replaceable lens. Accordingly, the user can determine an angle of view without hesitation and perform effective zoom control at the user's intentional timing.

A case will be described next in which there is a lens unit zoom operation (YES at step S31) and the angle of view for zoom has been already set by the angle-of-view setting unit 282 (YES at step S37). In this case, the controller 28 performs zoom control according to the set angle of view (step S39). The process at step S39 will be described in detail below with reference to FIGS. 9 to 13.

Figure 9:
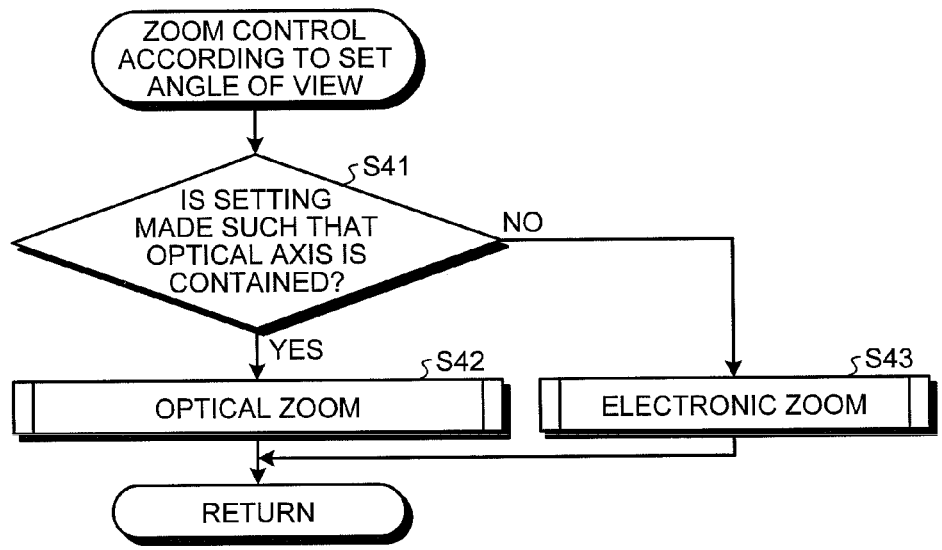
FIG. 9 is a flowchart of an overview of the zoom control process that is performed, in accordance with the set angle of view, by the imaging device according to the embodiment of the present invention.

FIG. 9 is a flowchart of an overview of the process at step S39. When an angle of view is set such that it contains the optical axis (YES at step S41), the controller 28 performs zoom control through an optical zoom (step S42). On the other hand, when the set angle of view is not set such that it contains the optical axis (NO at step S41), the controller 28 performs zoom control using an electronic zoom (step S43). After step S42 or step S43, the imaging device 1 goes to step S36 in FIG. 5. In FIG. 9, the type of zoom is changed depending on whether the angle of view to be set contains the optical axis. The optical zoom causes operating noise at zooming because it is mechanical operation. For example, the electronic zoom is preferable to the optical zoom in the situation where moving images of music concert are captured without the operating noise at zooming. In this regard, the imaging device 1 may have a function of capturing an image using only the electronic zoom. On the other hand, the electronic zoom may cause low quality of image with a large ratio of magnification. In this regard, the imaging device 1 may have a function of changing the electronic zoom to the optical zoom when the ratio of magnification of the electronic zoom is larger than a predetermined threshold.

Figure 10:
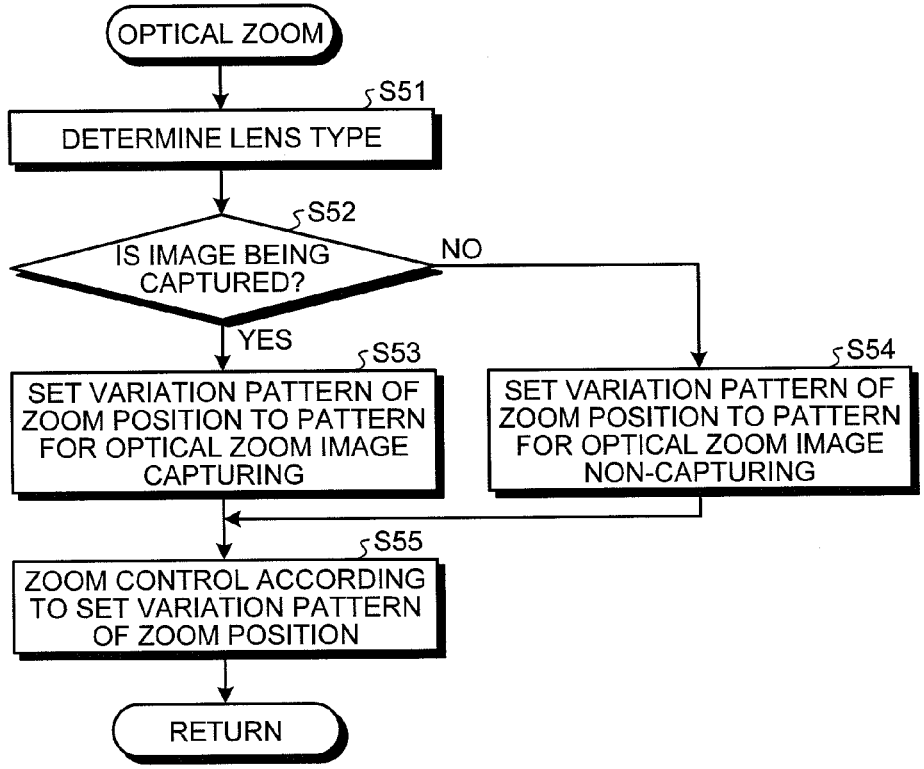
FIG. 10 is a flowchart of an overview of an optical zoom process performed by the image capturing apparatus according to the embodiment of the present invention.

FIG. 10 is a flowchart of an overview of the optical zoom process at step S42. First, the controller 28 determines the lens type of the lens unit 3 in accordance with the information transmitted from the lens unit 3 (step S51). The information received by the controller 28 is, for example, information unique to the lens unit 3 (identification information).

When the imaging device 1 is capturing an image (YES at step S52), the controller 28 sets a variation pattern of the zoom position to a pattern for optical zoom image capturing (step S54). The controller 28 then performs zoom control according to the set variation pattern of the zoom position (step S55). Accordingly, the optical zoom process ends.

At step S52, when the imaging device 1 is not capturing an image (NO at step S52), the controller 28 sets the variation pattern of the zoom position to a pattern for optical zoom image non-capturing (step S53) and goes to step S55.

Figure 11:
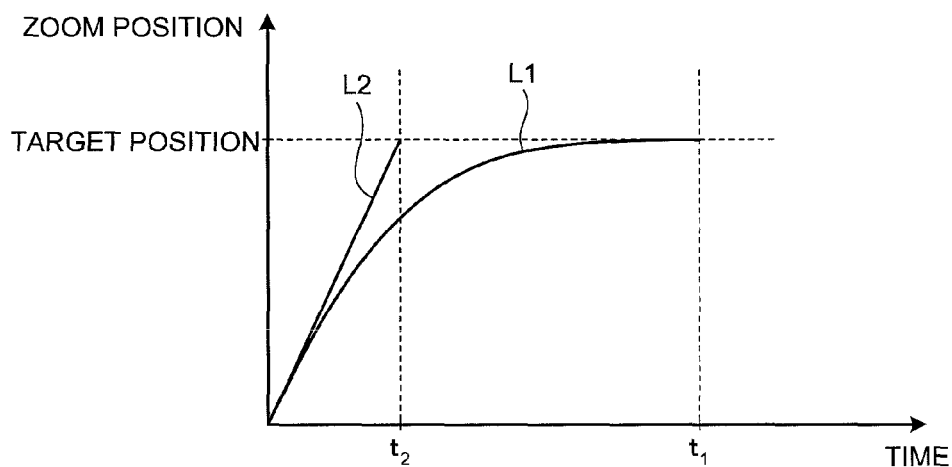
FIG. 11 is a graph of an example of a variation pattern of the zoom position in the optical zoom process.

FIG. 11 is a graph of an example of the variation pattern of the zoom position in the optical zoom process. In FIG. 11, while the curved line L1 corresponds to the pattern for optical zoom image capturing, the straight line L2 corresponds to the pattern for optical zoom image non-capturing. The image non-capturing corresponds to the state where the imaging device 1 is set to the capturing mode before the instruction signal for starting image capturing is input and after the instruction signal for ending image capturing is input. As is clear from FIG. 11, the time $t_1$ (time of arrival) until the zoom position reaches a target position for image capturing is longer than the time of arrival $t_2$ for image non-capturing. For example, $t_1$ can be three seconds and $t_2$ can be one second. In addition, while the zoom speed is constant to the target position for image non-capturing (the straight line L2), the zoom speed decreases as the zoom position becomes close to the target position for image capturing (the curved line L1). Accordingly, while the target position can be reached relatively quickly for image non-capturing (for example, before image capturing) so that the perfect shot is not missed, images near the target position can be captured for a relatively long time for image capturing in consideration of the viewability of the process to reach the target position more slowly than for the image non-capturing. This enables the user to enjoy the zoom process when the images are played and allows for image capturing with reducing eye strain.

Figure 17:
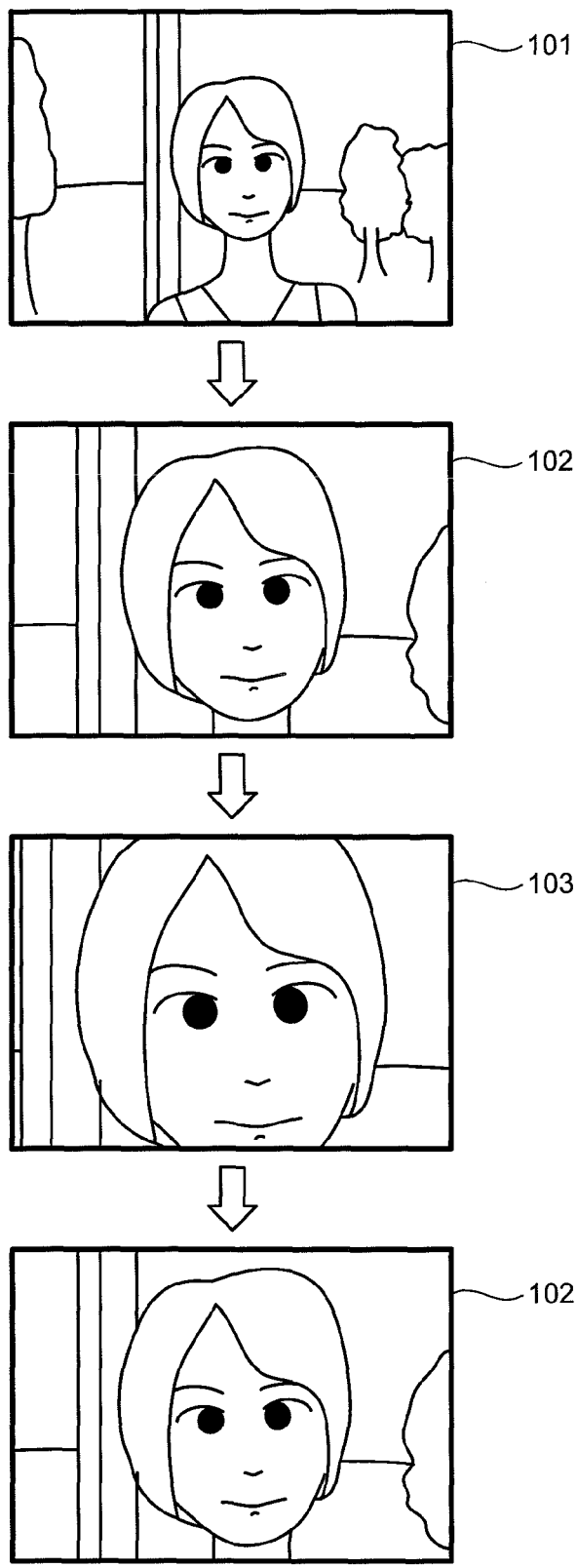
FIG. 17 is a diagram illustrating a problem of a conventional imaging device.

In this manner, by performing a process to zoom to an angle of view, which is specified by the user's fingers, moving images can be captured without capturing scenes from the image 102 to the image 103 and back to the image 102 in FIG. 17.

The times of arrival $t_1$ and $t_2$ may be set according to the type of the lens unit 3 or set to each time by the user. The variation patterns do not need to be curved or straight lines like those in FIG. 11. For example, the variation pattern for image capturing may be in a straight line and the variation pattern for image non-capturing may be in a curved line. If the imaging device 1 zooms in to the target position and then returns to the original angle of view by zooming out, an axis passing through the time at which the target position is reached and orthogonal to the time axis may be set as an axis of symmetry and the zoom position may be symmetrically varied chronologically. For example, for image non-capturing, while the zoom position may be varied chronologically along the straight line L2 before it reaches the target position and, after reaching the target position, the zoom position may be varied chronologically along a straight line having a gradient equal to that of the straight line L2 but with a different sign.

Figure 12:
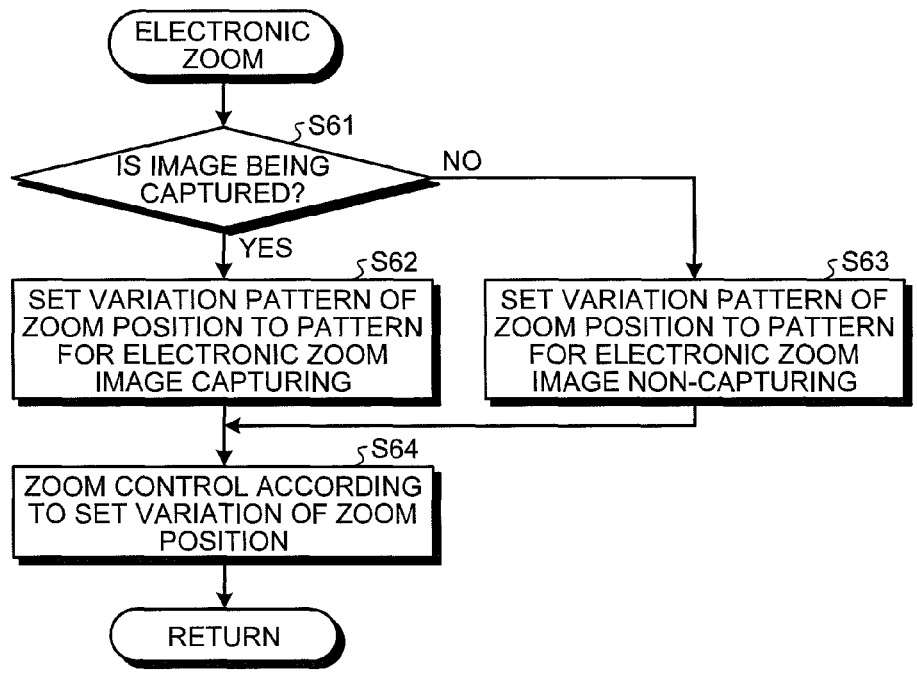
FIG. 12 is a flowchart of an overview of the electronic zoom process performed by the imaging device according to the embodiment of the present invention.

FIG. 12 is a flowchart of an overview of the electronic zoom process at step 843. As illustrated in FIG. 12, when the imaging device 1 is capturing an image (YES at step S61), the controller 28 sets the variation pattern of the zoom position to a pattern for electronic zoom image capturing (step S62). The controller 28 then performs zoom control in accordance with the variation pattern of the set zoom position (step S64). Accordingly, the electronic zoom process ends.

At step S61, when the imaging device 1 is not capturing an image (NO at step S61), the controller 28 sets the variation pattern of the zoom position to a pattern for electronic zoom image non-capturing (step S63) and then goes to step S64.

The variation patterns of the zoom position for image capturing and image non-capturing are similar to variation patterns of the zoom position for image capturing and image non-capturing with optical zoom (see FIG. 11). Obviously, the time of arrival to the target position in each variation pattern varies.

Figure 13:
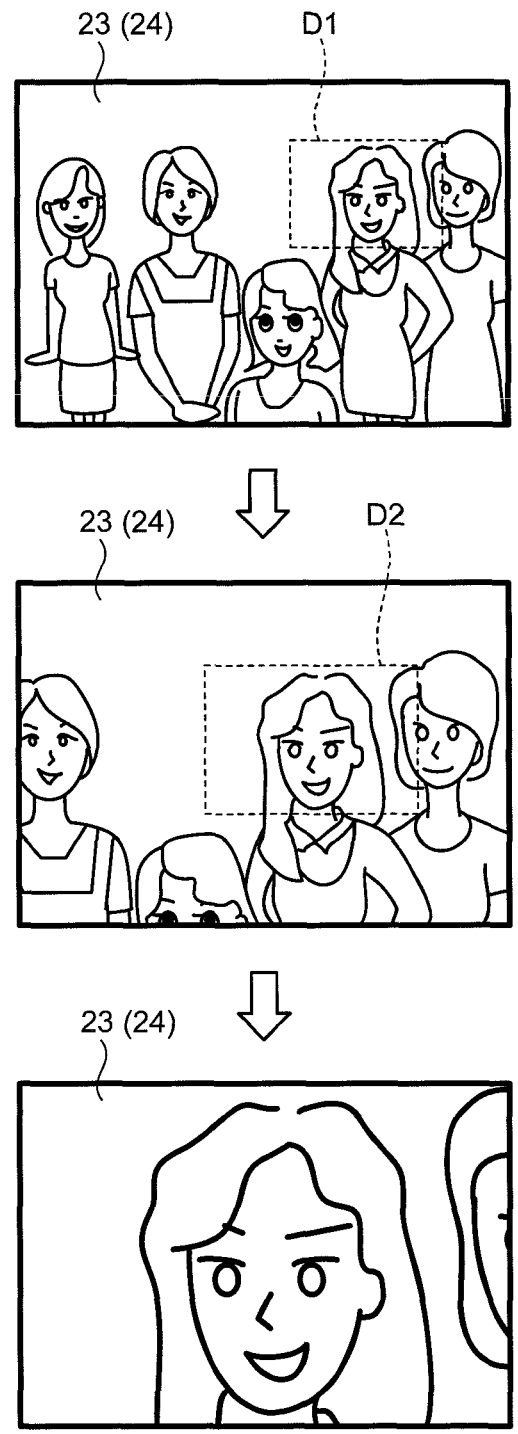
FIG. 13 is a diagram illustrating how the image display varies in the electronic zoom process.

FIG. 13 is a diagram illustrating how the image display varies in the electronic zoom process. An area D1 not containing the optical axis moves to the center of the screen while gradually being enlarged (see an area D2 in FIG. 13) and finally covers the entire screen of the display unit 23. As described, even if an angle of view is set in an area not containing the optical axis, the electronic zoom enables zoom control like that with an optical zoom.

As described above, in the first embodiment, the control of changing the image to be displayed on a screen provided with the touch panel 24 to the image on the area specified by a signal (first signal) input by multiple touch performed on the touch panel 24 is started according to a lens unit zoom operation signal (second signal). The second signal may be input by operating a switch provided on a predetermined area of the touch panel or the body of the imaging device.

According to the above-described embodiment of the present invention, an angle of view, to which the angle of view should be changed, is set in accordance with a point, on a touch panel, touched by an external object, and changing to the set angle of view is performed; therefore, a zoom operation deviating from the set angle of view is not performed. Thus, a smooth zoom operation to a desired angle of view, a display, and image capturing can be realized.

According to the first embodiment, the user can specify an area to be enlarged only with touching by the user's finger without additional operation such as moving the finger over the display unit. This allows the user to view the image on the display unit for a long time and thus facilitate image capturing.

Figure 14:
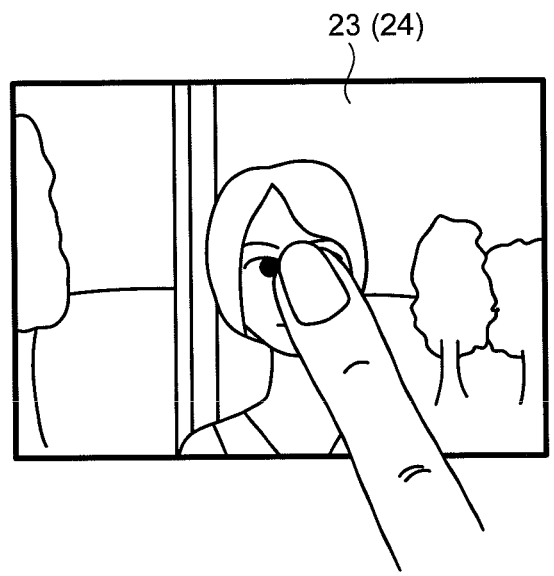
FIG. 14 is a diagram of another method of setting an angle of view.
Figure 15:
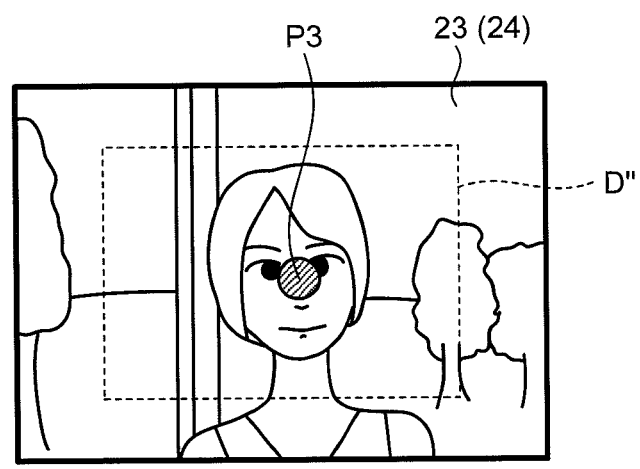
FIG. 15 is a diagram of an area of an angle of view that is set by the angle-of-view setting unit using the setting method in FIG. 14.

The present invention also makes it possible to set an angle of view by touching only one finger to the touch panel 24. For example, as illustrated in FIG. 14, when a user touches a part of the face of a subject with the forefinger of the user's right hand, the angle-of-view setting unit 282 sets an area containing a predetermined size of the face, which is contained in the touched portion, without the face being out of the screen. FIG. 15 is an example in which such an area is set. As illustrated in FIG. 15, according to the information on a finger-touched area P3 and information on the face of the subject detected by the face detector 281, the angle-of-view setting unit 282 sets an angle of view (area D'') that contains the face, which contains a finger-touched portion P3, to a predetermined ratio. The area to be specified on the touch panel should be specified so that the entire face of the face image touched is not out of the display area. A frame indicating that the entire face specified on the touch panel is within the display area may be displayed.

Figure 16:
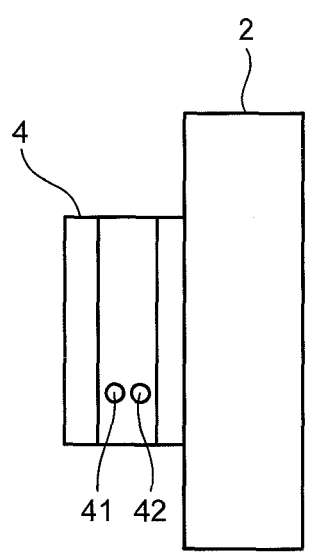
FIG. 16 is a diagram of another configuration example of a lens operation unit.

In the present invention, a focus lens may be used for the lens operation unit 34 instead of the zoom ring. Alternatively, as the lens operation unit 34, two switches like switches 41 and 42 illustrated in FIG. 16 may be provided around the zoom lens 31. The two switches 41 and 42 correspond to the two rotation directions of the zoom ring used for the lens operation unit 34.

The present invention may be applied to zoom control in still image capturing.

In the present invention, an operation input unit provided on the body of the imaging device may receive the signal for starting change control of angle of view.

The present invention can be applied to a display device having no image capturing function. Specifically, the present invention can be provided as a display device that includes a display unit that displays an image corresponding to image data; an angle-of-view setting unit that sets an angle of view to be changed for the image displayed on the display unit according to an external signal; and a control unit that starts control of change to the angle of view set by the angle-of-view setting unit according to a signal different from the signal for setting the angle of view.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An imaging device capable of performing image capturing and non-capturing operations, the imaging device comprising:
   an imaging unit that photoelectrically converts light received through an image capturing lens and generates image data;
   a display unit that displays an image related to the image data;
   a touch panel provided on the display unit and configured to perform input to receive a user-specified position for changing an angle of view of the image displayed by the display unit;
   an angle-of-view setting unit that sets an angle of view of the image displayed by the display unit according to the input received by the touch panel;
   an angle-of-view change pattern setting unit that sets an angle-of-view change pattern, with respect to time, of the image displayed by the display unit according to the input received by the touch panel, to a first angle-of-view change pattern when the imaging device is not capturing an image and to a second angle-of-view change pattern, different from the first angle-of-view change pattern, when the imaging device is capturing an image; and
   a controller that gradually changes the angle of view of the image displayed by the display unit, with respect to time, using the set one of the first and second angle-of-view change patterns.

2. The imaging device according to claim 1, further comprising an angle-of-view change pattern storage unit that has stored therein the first angle-of-view change pattern and the second angle-of-view change pattern.

3. The imaging device according to claim 1, wherein a time to reach a target angle-of-view with the first angle-of-view change pattern is set shorter than a time to reach the target angle-of-view with the second angle-of-view change pattern.

4. The imaging device according to claim 1, wherein the first angle-of-view change pattern is set such that an angle-of-view change speed does not become slower even near a target angle-of-view and the second angle-of-view change pattern is set such that an angle-of-view change speed becomes slower near the target angle-of-view.

5. The imaging device according to claim 1, wherein selected angle-of-view change patterns are applied to changes in the angle-of-view based on the first angle-of-view change pattern and the second angle-of-view change pattern regardless of whether optical zoom or electronic zoom is performed respectively.

6. The imaging device according to claim 1, wherein patterns of change or times to reach a target angle-of-view in the first angle-of-view change pattern and the second angle-of-view change pattern are settable according to the image capturing lens.

7. The imaging device according to claim 1, wherein
   the touch panel is one of a plurality of operation units, and
   the controller performs control to stop the changing of the angle-of-view if a stop operation is performed by any of the plurality of operation units while the changing of the angle-of-view during the image capturing is being performed.

8. The imaging device according to claim 1, wherein
   input received from the touch panel is provided to correspond to the imaging lens, the imaging device, and the display unit, and
   the controller changes operations related to changing of angle-of-view according to the input from the touch panel.

9. An imaging method, comprising:
receiving and photoelectrically converting light and generating image data;
displaying an image related to the image data;
receiving a user-specified touch-screen input for changing an angle of view of the image displayed;
setting an angle of view of the image displayed, according to the input received;
setting an angle-of-view change pattern, with respect to time, of the image displayed according to the input received to a first angle-of-view change pattern when an image is not being captured and to a second angle-of-view change pattern, different from the first angle-of-view change pattern, when an image is being captured; and
changing, gradually, the angle of view of the image displayed, with respect to time, using the set one of the first and second angle-of-view change patterns.

10. A non-transitory computer-readable recording medium storing a computer program for causing a computer to perform:
receiving and photoelectrically converting light and generating image data;
displaying an image related to the image data;
receiving a user-specified touch-screen input for changing an angle of view of the image displayed;
setting an angle of view of the image displayed, according to the input received;
setting an angle-of-view change pattern, with respect to time, of the image displayed according to the input received to a first angle-of-view change pattern when an image is not being captured and to a second angle-of-view change pattern, different from the first angle-of-view change pattern, when an image is being captured; and
changing, gradually, the angle of view of the image displayed, with respect to time, using the set one of the first and second angle-of-view change patterns.

11. The imaging device according to claim 1, wherein each of the first and second angle-of-view change patterns defines a change, with respect to time, of zoom position from a current zoom position to a target zoom position.

12. The imaging method of claim 9, wherein each of the first and second angle-of-view change patterns defines a change, with respect to time, of zoom position from a current zoom position to a target zoom position.

13. The non-transitory computer-readable recording medium of claim 10, wherein each of the first and second angle-of-view change patterns defines a change, with respect to time, of zoom position from a current zoom position to a target zoom position.

* * * * *